United States Patent [19]

Aüch et al.

[11] Patent Number: 4,638,266
[45] Date of Patent: Jan. 20, 1987

[54] ACOUSTOOPTICAL MODULATOR AND/OR DEFLECTOR

[75] Inventors: Wilfried Aüch, Asperg; Eberhard Schlemper, Vaihingen, both of Fed. Rep. of Germany

[73] Assignee: International Standard Electric Corporation, New York, N.Y.

[21] Appl. No.: 669,489

[22] Filed: Nov. 7, 1984

[30] Foreign Application Priority Data

Nov. 11, 1983 [DE] Fed. Rep. of Germany ....... 3340809

[51] Int. Cl.$^4$ ............................................. G02F 1/33
[52] U.S. Cl. .................................... 332/7.51; 350/358
[58] Field of Search .................... 332/7.51; 372/13; 350/358; 307/429

[56] References Cited

U.S. PATENT DOCUMENTS

| Re. 29,557 | 2/1978 | Isaacs et al. | 350/358 |
|---|---|---|---|
| 2,155,659 | 4/1939 | Jefree | 350/358 |
| 3,088,113 | 4/1963 | Rosenthal | 350/358 |
| 3,419,322 | 12/1968 | Adler | 350/358 |
| 3,562,414 | 2/1971 | Blum | 350/358 |
| 3,661,441 | 5/1972 | Uchida et al. | 350/358 |
| 3,843,234 | 10/1974 | Dobrzhansky et al. | 350/358 |
| 3,897,152 | 7/1975 | Farmer et al. | 350/358 |
| 4,054,367 | 10/1977 | Eschler et al. | 350/358 |
| 4,217,036 | 8/1980 | Chang | 350/358 |
| 4,367,426 | 1/1983 | Hohki | 350/358 |
| 4,549,789 | 10/1985 | Horiuchi et al. | 350/358 |

FOREIGN PATENT DOCUMENTS

| 0085581 | 10/1983 | European Pat. Off. | 350/358 |
|---|---|---|---|
| 0100238 | 2/1984 | European Pat. Off. | 350/358 |

Primary Examiner—Nelson Moskowitz
Attorney, Agent, or Firm—John T. O'Halloran; Robert P. Seitter

[57] ABSTRACT

Two electrical-to-acoustical transducers (W1, W2) are attached to two contiguous sides of a cube (B) made of optically transparent material. The propagation directions of the two waves delivered by the transducers intersect inside the cube. The frequency of the light beam striking the device is shifted by $f_1-f_2$, where $f_1$ and $f_2$ are the frequencies of the drive signals for the two transducers. The deflection of the light beam in the two propagation directions of the sound waves is proportional to the frequencies of the drive signals.

7 Claims, 5 Drawing Figures

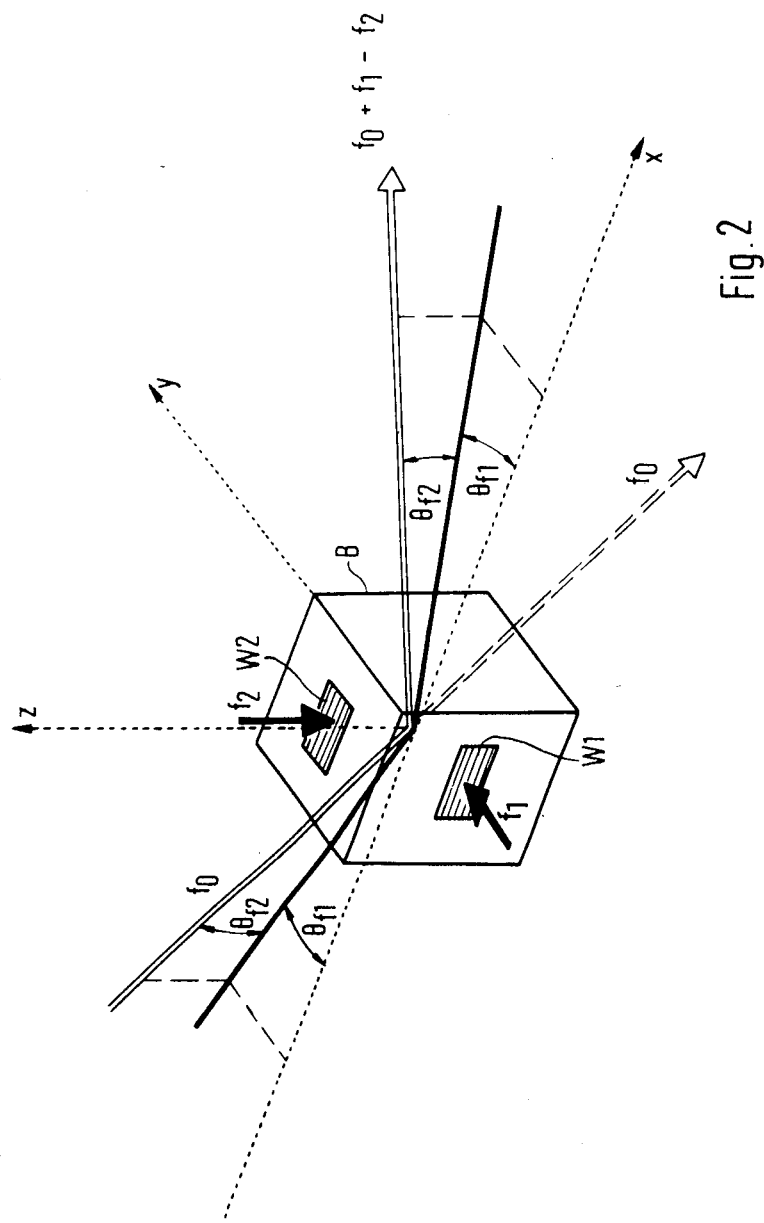

ACOUSTOOPTICAL MODULATOR AND/OR DEFLECTOR

The present invention relates to an acoustooptical modulator and/or deflector comprising an optically transparent material and an electrical-to-acoustical transducer for producing acoustic waves in said material. Such a device is described in an article by I. C. Chang, "Acoustooptic Devices and Applications", IEEE Transactions on Sonics and Ultrasonics, SU-23, pp. 2 to 22, 1976.

Such a device shifts the optical frequency of a light beam passing through it, and deflects this beam from its original direction. Accordingly, such a device can be used as a light modulator (the case in which only a shift of the optical frequency is produced will hereinafter be referred to as "light modulation", too) and/or as a light deflector.

Both the deflection angle and the frequency change caused by modulation depend on the frequency of the drive signal applied to the electrical-to-acoustical transducer. Aside from frequency modulation, intensity modulation can be effected with such a device. The intensity modulation depends on the power of the drive signal for the transducer. A disadvantage is that, for reasons of realizability, a given minimum frequency (approx. 20 MHz for commercially available components) is required to drive the electrical-to-acoustical transducer. Thus, the known device cannot be used to produce small changes in optical frequency. If the electrical-to-acoustical transducer were (unrealistically) made so large in dimensions that low drive frequencies were possible, the emergent frequency-shifted light beam would be separated from the emergent light beam not shifted in frequency by such a small angle that it would be nearly impossible to block out either of the beams.

It is the object of the invention to provide an acoustooptical modulator and/or deflector which also permits small changes in the frequency of a light beam passing through it.

This object is attained by the means set forth in claim 1. Advantageous developments are claimed in the subclaims.

With the novel device, it is possible not only to produce small changes in the frequency of the light beam but also to separate the "frequency-shifted" light beam from the "non-frequency-shifted" light beam. Consequently, even in case of small frequency changes, ideal carrier suppression is obtained if the "non-frequency-shifted" light beam is blocked out. Optimum efficiency with respect to the "frequency-shifted" light beam is obtained if the light beam strikes the device at the angle for which Bragg reflection occurs.

With the novel device, acoustic waves are produced in two directions. This permits a two-dimensional deflection of the light beam, which is advantageous in many applications (e.g., "optical writing").

The novel device can be used to advantage in the fiber gyro disclosed in DE-OS No. 31 36 688. In the fiber gyro described there, it is desirable for a particular mode of operation that a phase difference of $(\pi/2)$ be produced between the two component beams travelling around the optical fiber in opposite directions. If a known acoustooptical modulator is driven at 100 MHz for this purpose, a phase difference of $973\pi$ (at a length of the optical fiber of 1 km) instead of $(\pi/2)$ will be produced. To produce a phase difference of $(\pi/2)$, therefore, use must be made of two such devices which are driven at 100 MHz and 100.05 MHz, respectively. With the novel device, a frequency shift of 50 kHz can be produced directly, so that it is possible to produce the desired phase difference of $(\pi/2)$ with a single device.

The invention will now be explained in more detail, by way of example, with reference to the accompanying drawings, in which:

FIG. 2 is a sketch illustrating the beam paths through the novel device, and

Acoustooptical modulators and/or deflectors are frequently referred to as "Bragg cells". This term will be used in the following.

Figure 1A:
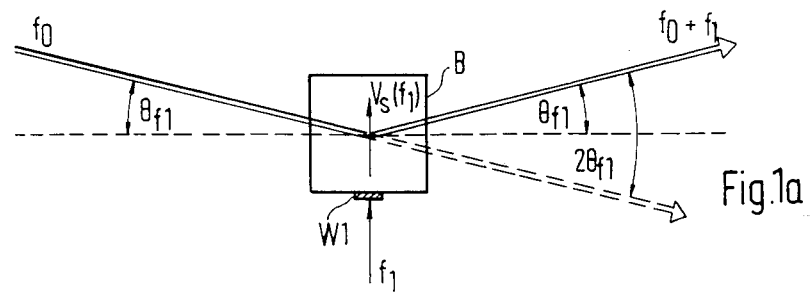
FIGS. 1a and 1b are sketches illustrating how the change in the frequency of the light beam is produced.

In FIG. 1a, a light beam of frequency $f_0$ strikes a Bragg cell B from the left. The Bragg cell has the shape of a cube; its edge is 5 mm. Attached to one side of the cube is an electrical-to-acoustical transducer W1, whose electric drive signal has the frequency $f_1$. It delivers an acoustic wave which propagates in the direction $V_s(f_1)$. The incident light beam and the normal to the propagation direction of the acoustic wave include an angle of $\theta_{f1}$ which is chosen so that Bragg reflection occurs (Bragg reflection is explained in the first-mentioned reference). If the incident light beam strikes the acoustic wave at this angle $\theta_{f1}$, it is ensured that the frequency-shifted output light beam has the maximum intensity.

The Bragg cell B divides the incident light beam into two output light beams. The beam not shifted in frequency leaves the Bragg cell unchanged in direction, and the other beam, which is shifted in frequency, is deviated through twice the Bragg angle, $2\theta_{f1}$.

If the frequency $f_1$ of the drive signal for the transducer W1 is changed, the Bragg angles will change as well. In case of changes in the range from 50 to 100 kHz, the changes of the Bragg angle are so small that the use of the Bragg cell as a frequency modulator is not decisively affected. Only slight intensity variations of the output light beam are obtained.

It is also possible to make the incident light beam strike the Bragg cell at an angle different from the Bragg angle. The angles at which the emergent light beams leave the Bragg cell and the energy distribution among the emergent light beams are familiar to those skilled in the art. Reference is made, for example, to the book "Topics in Applied Physics", Vol. 7, "Integrated Optics", edited by T. Tamir, Springer-Verlag Berling, 1979 (especially pages 155 to 157).

Figure 1B:
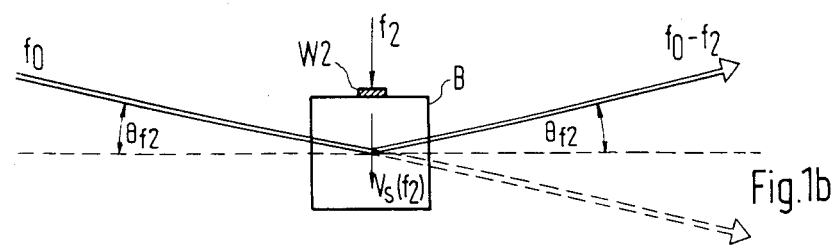

An arrangement similar to that of FIG. 1a is shown in FIG. 1b. The frequency of the drive signal for the transducer W2 is $f_2$; the Bragg angle is $\theta_{f2}$, and the propagation direction of the acoustic wave is $V_2(f_2)$.

The two arrangements differ essentially in that in the arrangement of FIG. 1a, the propagation direction of the incident light beam has a component opposite the propagation direction of the acoustic wave issuing from the transducer W1, while in the arrangement of FIG. 1b, the propagation direction of the incident light beam has a component in the propagation direction of the acoustic wave issuing from the transducer W2.

As a result, the frequency of the frequency-shifted output light beam is shifted by $+f_1$ in the arrangement of FIG. 1a, and by $-f_2$ in the arrangement of FIG. 1b. This property is utilized in the novel Bragg cell.

Figure 1C:
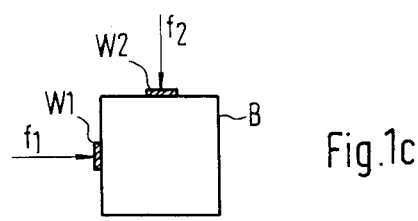
FIG. 1c is a cross-sectional view of the novel device.

FIG. 1c shows a cross section through the novel Bragg cell. The light beam is directed into the plane of the paper. Attached to two contiguous sides of the Bragg cell are a transducer W1 and a transducer W2, respectively, which deliver two acoustic waves that intersect in the Bragg cell at right angles.

The beam paths through such a Bragg cell will now be explained with the aid of FIG. 2. As described with the aid of FIG. 1c, two contiguous sides of the Bragg cell B support transducers W1 and W2, which are driven by electric signals with the frequencies $f_1$ and $f_2$.

An imaginary rectangular coordinate system with the three axes x, y, and z is placed into the center of the cubical Bragg cell, such that one of the transducers, W1, lies in a plane parallel to the xz-plane, while the other, W2, lies in a plane parallel to the xy-plane. The incident beam makes an angle of $\theta_{f2}$ with the xy-plane, and an angle of $\theta_{f1}$ with the xz-plane. The frequency-shifted output beam and the planes just mentioned include angles of $\theta_{f1}$ and $\theta_{f2}$, respectively.

The frequency of the output light beam is shifted with respect to the frequency of the incident light beam by $f_1$-$f_2$. By choosing suitable values for $f_1$ and $f_2$, a frequency-shifted light beam can be produced whose frequency shift is small (e.g., 50 kHz) compared with its carrier frequency, whereas the angular separation from the non-frequency-shifted beam is large, because this angle is determined by the large values for $f_1$ and $f_2$ (e.g., 100 MHz and 100.05 MHz).

If the device is used as a light deflector, the frequenies $f_1$ and $f_2$ will be changed so that the output light beam is deviated through the desired angle.

Figure 3:
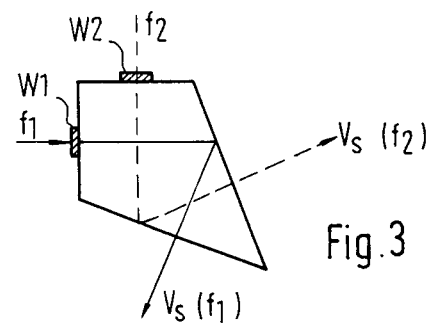
FIG. 3 is a cross-sectional view of a preferred embodiment of the novel device.

In the embodiment of FIG. 3, those surfaces of the Bragg cell which are struck by the acoustic waves are inclined to the normals to the propagation directions. This ensures that the acoustic waves are so reflected at these surfaces as not to interact with the light beam. This can also be prevented by directing the acoustic waves emerging from the Bragg cell to a sound-absorbing material. It is also possible to combine these two solutions, i.e. to provide inclined surfaces and apply sound-absorbing material to them.

We claim:
1. An acoustooptical device comprising:
   (a) an optically transparent material;
   (b) means for producing a first acoustic wave of frequency $f_1$ and propagating said first acoustic wave into said material in a first wave propagation direction;
   (c) means for producing a second acoustic wave of frequency $f_2$, different from said frequency $f_1$, and propagating said second acoustic wave into said material in a second wave propagation direction at least approximately perpendicular to said first wave propagation direction; and
   (d) means for directing an incident light beam into said transparent material in a predetermined incident beam propagation direction having a component opposite to said first wave propagation direction and also having a component codirectional with said second wave propagation direction, so that Bragg reflection occurs, whereby an output light beam is provided having a frequency shift of ($f_1$-$f_2$) with respect to the frequency of the incident beam.

2. A method of shifting the frequency of an incident light beam comprising the steps of:
   (a) producing a first acoustic wave of frequency $f_1$ and propagating said first acoustic wave into an optically transparent material in a first wave propagation direction;
   (b) producing a second acoustic wave of frequency $f_2$, different from said frequency $f_1$, and propagating said second acoustic wave into said transparent material in a second wave propagation direction at least approximately perpendicular to said first wave propagation direction; and
   (c) directing said incident light beam into said transparent material in an incident beam propagation direction having a component opposite to said first wave propagation direction and also having a component codirectional with said second wave propagation direction so that Bragg reflection occurs within said transparent material, whereby an output light beam is provided having a frequency shift of ($f_1$-$f_2$) with respect to the frequency of said incident beam.

3. A method as claimed in claim 2 wherein said first wave and second wave propagation directions are perpendicular to one another.

4. A method as claimed in claim 2 wherein one of said acoustic waves has a frequency of about 100 MHz and the other one of said acoustic waves has a frequency of about 100.05 MHz, whereby said frequency shift is about 50 KHz.

5. An acoustooptical device as claimed in claim 1, characterized in that said first wave and second wave propagation directions are perpendicular to each other.

6. An acoustooptical device as claimed in claim 1, characterized in that the optically transparent material is bounded by plane surfaces, and that the surfaces struck by the acoustic waves emanating from said acoustic wave producing means are inclined with respect to said wave propagation directions at angles chosen so that the acoustic waves striking said inclined surfaces are reflected away from the center of the optically transparent material.

7. An acoustooptical device as claimed in claim 1, characterized in that in or on those portions of the optically transparent material which are opposite to said acoustic wave producing means, sound-absorbing material is present.

* * * * *